July 9, 1940.  K. A. HARVEY  2,207,006
TRAILER COUPLING
Filed March 21, 1939
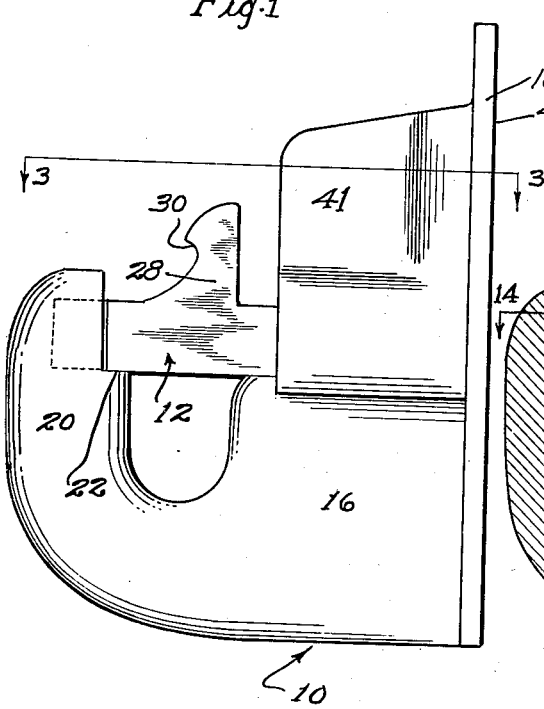
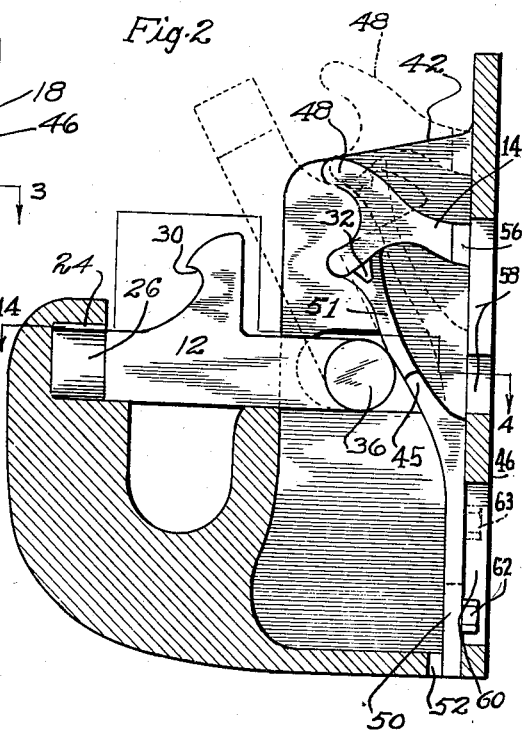
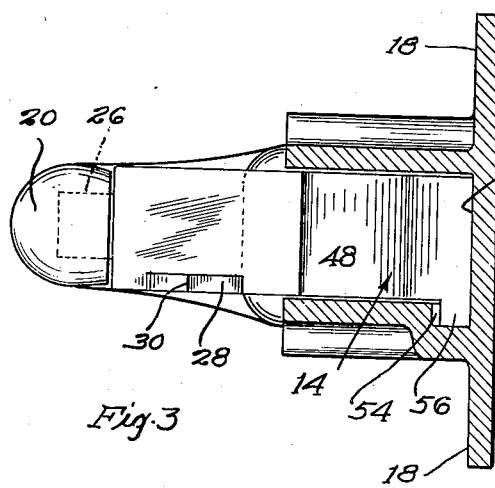
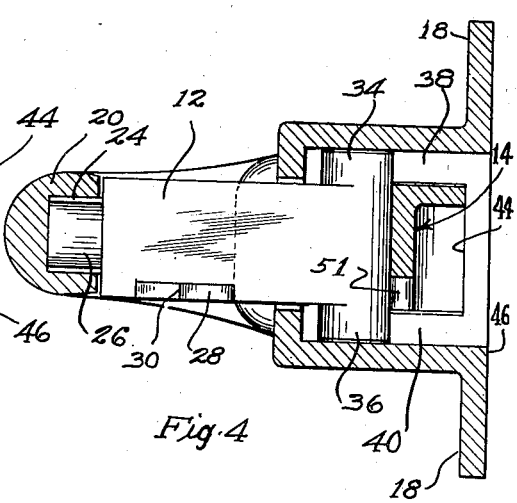
INVENTOR.
Kenneth A. Harvey
BY
ATTORNEY.

Patented July 9, 1940

2,207,006

UNITED STATES PATENT OFFICE 2,207,006

TRAILER COUPLING

Kenneth A. Harvey, Los Angeles, Calif.

Application March 21, 1939, Serial No. 263,159

4 Claims. (Cl. 280—33.15)

The device of the present invention relates to mechanical means to releasably attach a drawn to a driven vehicle, and the objects of the invention are to provide a simple, sturdy, easily operated, and low cost coupling for the above stated purpose.

Other objects, features, and advantages of the invention may appear from the accompanying drawing, the specification, and the appended claims.

In the drawing of which there is one sheet:

Figure 1 is a side elevation showing the coupling of this invention.

Figure 2 is a mid-vertical sectional elevation showing the operative relation between the several elements of the invention.

Figure 3 is a plan view in section, the view being taken approximately on line 3—3, in Figure 1.

Figure 4 is a further sectional view in plan, the view being that taken on line 4—4, in Figure 2.

The coupling of this invention is quite simple, being formed of three cast-metal parts, i. e., a base 10, a latch 12, and a keeper 14 as shown in the several figures of the drawing.

The base 10 is formed as a monolithic structure, of which 16 is a body portion having outwardly projecting flanges 18 through which holes may be drilled for bolting the coupling to suitable structure upon the driven vehicle.

An upturned hook 20 formed integral with the body portion 16 is adapted to receive the eyelet of the draw-bar of the drawn vehicle, while adjacent the upper end of the hook 20 a step or recess 22 is formed to create a rest for one end of the latch 12. The hook 20 is also provided with an annular recess or cavity 24 adjacent the step 22 to receive an annular boss 26 formed upon the free end of the latch whereby the same may be securely held in position.

The latch 12 is provided with an upwardly extending portion 28 having a hook 30 formed thereon for periodic engagement with a lug 32 formed as a part of the keeper 14. The inner end of the latch is formed with outwardly extending bosses 34 and 36 which move through elongated recesses 38 and 40 in the side-walls of the body portion 16. The bosses 34 and 36 also form turning points for partial rotation of the latch when moved from normal horizontal position as shown in the several figures to lifted position as shown in dotted lines in Figure 2.

The upper-halves 41 and 42 of the body portion 16 are spaced apart to provide clearance for placement and removal of the keeper 14 which is adapted to normally be positioned within said body portion in such manner as to form a wedge between the inner wall 44 of the back 46 of the coupler body and the inner end of the latch 12 as shown particularly in Figures 2 and 4.

The keeper is provided with a convenient finger grip 48 while its lower front portion is curved at 45 in the manner of a cam as shown in Figure 2, the line of curvature continuing to bend upon itself until it intersects the rear face thereof to form a tongue 50 the lower end of which is normally positioned within an opening 52 formed in the bottom wall 54 of the body portion 16.

The front surface of the keeper is partially cut-away at 51 to receive the portion 28 when swung upwardly to dotted line position to effect union of the hook 30 with the lug 32.

The side 41 is formed with a vertical groove 54 through which a lug 56 formed upon the keeper is adapted to move to prevent any possible forward tilting or other disarrangement of the keeper.

The back 46 is formed with openings 58 and 60, of which opening 58 is adapted to permit insertion of the latch 12, while opening 60 provides a slot-way to limit movement of the keeper in an upward direction by reason of the set-screw 62. Dotted lines 63 show the uppermost position needed to permit operation of the coupler without enabling the keeper to be completely withdrawn from the body of the device.

It is believed that application and use of the coupler of this invention will be readily understood by reference to the preceding descriptive matter and to the drawing, however there are certain salient features operative in the coupler of this invention which may best be drawn out by specific reference thereto.

Due to the fact that the coupler may be used upon variously shaped structural parts of vehicles and also due to the fact that very few commercial vehicles of different make have the same structural arrangement it has not been deemed necessary to show opening for placement of bolts or rivets for securing the coupler in place, suffice to state that after determining the points at which drilled openings are to occur, the latch 12 is inserted through the opening 58 to occupy the position shown in the several figures of the drawing. The keeper 14 is then dropped into position, progressively moving downward from the dotted line position to full line position shown in Figure 2. The set-screw 62 is then threaded into the tongue 50 to lock the keeper in place. The coupler may then be bolted or otherwise secured upon the vehicle upon which it is to be carried.

After having been secured in position for use, it is only necessary to lift upwardly upon the keeper 14 and then to lift the latch 12 to an approximate position as shown in dotted lines in Figure 2, the keeper is then slightly lowered until the lug 32 engages the hook 30, such union will hold the latch in elevated position. The vehicles to be united may then be maneuvered into such position that the eyelet of the draw-bar of the drawn vehicle may be placed upon the hook 20 after which it is only necessary to again slightly lift the keeper to release the latch which falls into place bridging the space above the eyelet of the draw-bar. The keeper is then released, its weight being sufficient to keep the boss 26 securely within the recess or cavity 24.

Attention is directed again to the drawing wherein it will be observed that ample clearance has been provided for each of the movable elements of the coupler, thereby ensuring that none of the parts will stick or otherwise become wedged into such a position that they are not free to be readily released when desired.

It will also be noted that the curvature given the front surface of the keeper is well adapted to constantly press the latch into forward position without ever becoming tightly wedged into such position as to need to be hammered before releasing the latch.

From the preceding description it is believed that it will be readily apparent that the coupler of this invention is without a peer, being strong, simple and reliable in operation, and of extremely low cost for the reason that there are but three elements present in the assembly, each of which is cast, and each of which may be directly assembled without further work being done upon them, except for drilling and tapping threads for the set-screw 62. It is obvious that various changes and modification and variations may be made in practicing the invention in departure from the particular showing of the drawing and description as given, without however, departing from the true spirit of the invention as defined by the scope of the appended claims.

I claim:

1. A coupler for vehicles comprising a body portion having an upturned hook formed with a cavity therein, a latch slidable across the mouth of said hook and being adapted to at least partially enter said cavity whereby said latch cannot be lifted, and a keeper having a tapered surface in contact with said latch whereby the same is urged into said recess.

2. A coupler for vehicles comprising a body portion having an upturned hook formed with a cavity therein, a latch slidably positioned across the mouth of said hook and being adapted to at least partially enter said cavity, and gravitationally actuated keeper having an inclined face adapted to be in pressure contact with the inner end of said latch whereby the free end of the latch will be forced into said cavity.

3. A coupler to join vehicles, in combination, a body portion having an upturned hook formed with a transversely positioned recess therein, a latch slidable across the mouth of said hook and adapted to have a free end thereon enter said recess, a gravitationally actuated keeper to constantly urge said latch into said recess and being formed with a lug thereon, and a hook on said latch to engage said lug to hold the latch in non-functional position when a draw-bar is being joined to said coupler.

4. The combination in a coupler for vehicles, of a body portion having an upturned hook formed with a transversely positioned recess therein, said body portion being formed with horizontally positioned slot-ways in the sides thereof, a latch having bosses fulcrumed in said slot-ways and being adapted to slidably move across the mouth of said hook to nest within said recess, a keeper positioned in said body portion and being gravitationally actuated to bring an inclined pressure surface thereon into pressure contact with one end of said latch to force the opposite end thereof into said recess, and cooperative means on said latch and said keeper whereby said latch may be predeterminedly held in inclined position in clearance of the mouth of said hook by said keeper.

KENNETH A. HARVEY.